US011271767B2

(12) United States Patent
Chen et al.

(10) Patent No.: US 11,271,767 B2
(45) Date of Patent: *Mar. 8, 2022

(54) VIRTUAL NETWORK ENDPOINTS FOR INTERNET OF THINGS (IOT) DEVICES

(71) Applicant: Verizon Patent and Licensing Inc., Basking Ridge, NJ (US)

(72) Inventors: Ming Chen, Bedford, MA (US); Dahai Ren, Lexington, MA (US); Lei Zhang, Frisco, TX (US); Matthew J. Threefoot, Columbia, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/021,593

(22) Filed: Sep. 15, 2020

(65) Prior Publication Data

US 2020/0412569 A1 Dec. 31, 2020

Related U.S. Application Data

(63) Continuation of application No. 16/018,298, filed on Jun. 26, 2018, now Pat. No. 10,805,104.

(51) Int. Cl.
*G06F 15/173* (2006.01)
*H04L 12/28* (2006.01)
*H04L 29/06* (2006.01)

(52) U.S. Cl.
CPC ........ *H04L 12/2814* (2013.01); *H04L 12/281* (2013.01); *H04L 12/283* (2013.01); *H04L 63/20* (2013.01)

(58) Field of Classification Search
CPC . H04L 12/2814; H04L 12/281; H04L 12/283; H04L 63/20
USPC .......................................... 709/203, 223–225
See application file for complete search history.

(56) References Cited

U.S. PATENT DOCUMENTS

| 10,447,683 | B1* | 10/2019 | Loladia ................. H04W 12/63 |
| 2017/0180380 | A1 | 6/2017 | Bagasra |
| 2018/0219920 | A1* | 8/2018 | Patel ....................... H04L 63/20 |
| 2018/0232250 | A1* | 8/2018 | Stephens ............... H04W 84/18 |
| 2019/0297078 | A1* | 9/2019 | Davis, III ............. H04L 63/205 |

\* cited by examiner

*Primary Examiner* — Duyen M Doan

(57) ABSTRACT

Systems and methods herein represent an IoT device as an endpoint of private cloud. A virtualization service receives an IoT identifier for an IoT device and a network address for a virtual endpoint for the IoT device. The virtual endpoint for the IoT device is included in a host cloud platform. The virtualization service maps the IoT identifier to the network address in a distributed data structure for the service provider network and provides instructions, for an edge node for the service provider network, to provide network-layer access controls based on the mapping. The edge node for the service provider network receives an access request from the IoT device, applies a network-layer access control for the IoT device based on the instructions, receive IoT data from the IoT device when the edge node permits access by the IoT device, and forwards the IoT data to the virtual endpoint.

20 Claims, 8 Drawing Sheets

VIRTUAL NETWORK ENDPOINTS FOR INTERNET OF THINGS (IOT) DEVICES

CROSS-REFERENCE TO RELATED APPLICATION

This application is a continuation of U.S. patent application Ser. No. 16/018,298, entitled "Virtual Network Endpoints for Internet of Things (IoT) Devices," filed on Jun. 26, 2018, the contents of which are hereby incorporated by reference.

BACKGROUND

The Internet of Things (IoT) connects many types of devices over a network. The devices (or "things") in the IoT can be a location tag, a connected thermostat, a monitoring camera, a sensor device, or anything that communicates data over an Internet connection. Devices in the IoT usually have a way to connect to the Internet to report data to other devices and request/receive information from other devices. IoT devices may connect to the Internet in a variety of ways. However, IoT devices may not be continually connected or accessible due to power constraints, network resource conservation, among other factors.

DETAILED DESCRIPTION OF PREFERRED EMBODIMENTS

Figure 1:
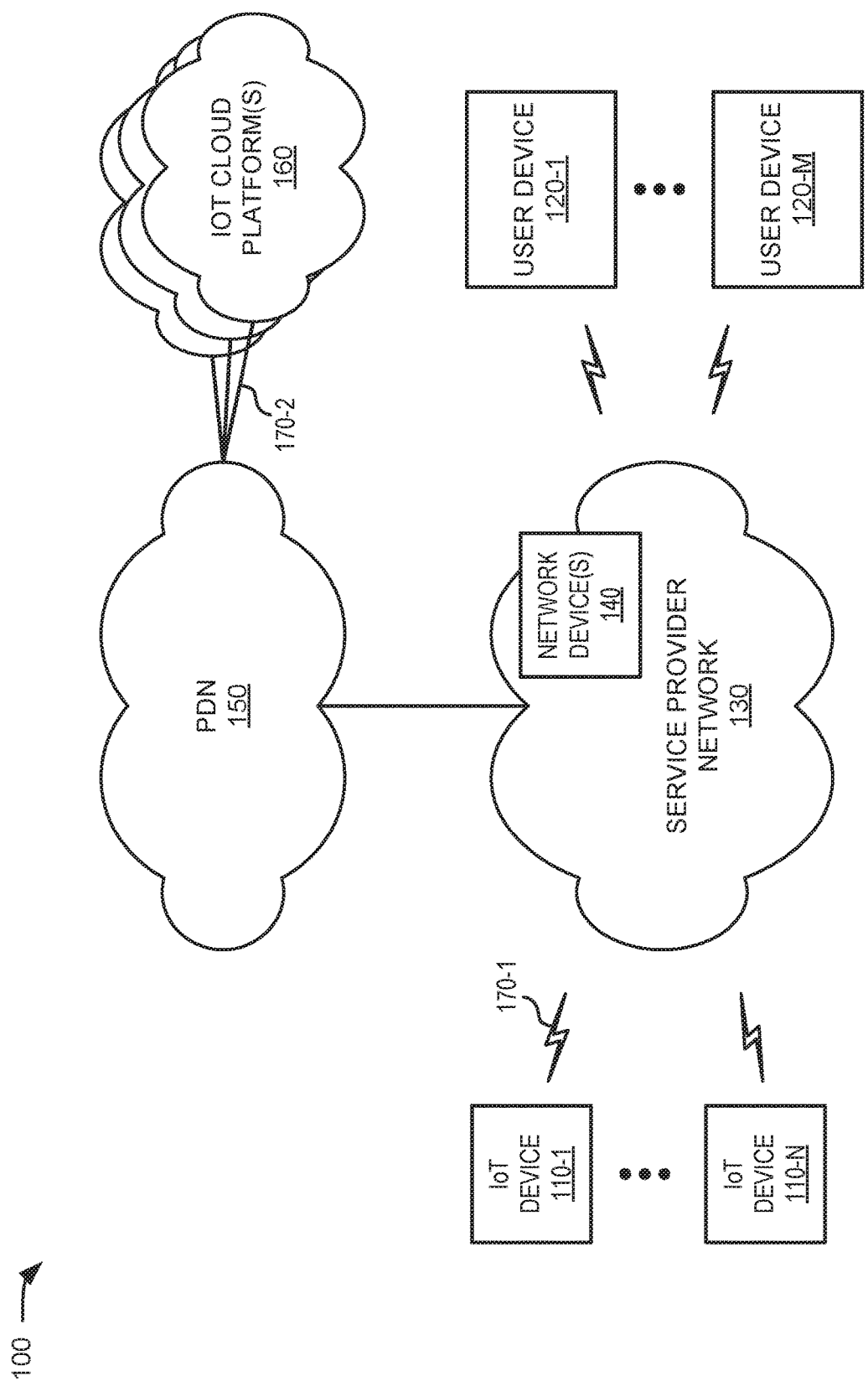
FIG. 1 is a diagram illustrating an exemplary network environment in which systems and/or methods described herein may be implemented.

The following detailed description refers to the accompanying drawings. The same reference numbers in different drawings may identify the same or similar elements. Also, the following detailed description does not limit the invention.

Systems and methods herein represent an IoT device as an endpoint of private cloud so that the enterprise systems or services in the private cloud can interact with the IoT device just like any other enterprise resource.

Currently, a "device shadow" approach is widely used in IoT platforms to expose IoT devices for customers to access and operate. Implementations described herein provide a new approach to serve IoT devices as private network endpoints. In contrast with the "device shadow" approach, systems and methods described herein represent IoT devices as virtual network endpoints. Therefore, enterprise applications can interact remotely with IoT devices in a similar way to interacting with a local network peer. Systems and methods described herein simplify customers' access to IoT devices as a local network connection, delegate IoT device access control as a network operation, improve horizontally scalability, and ensure high availability using network tools and protocols.

According to an implementation described herein, a service provider network includes multiple regional clusters that each includes a virtualization service, which may be executed on one or more devices, and an edge node. The virtualization service receives an IoT identifier for an IoT device and a network address for a virtual endpoint for the IoT device. The virtual endpoint for the IoT device is included in a host cloud platform. The virtualization service maps the IoT identifier to the network address in a distributed data structure for the service provider network and provides instructions, for an edge node for the service provider network, to provide network-layer access controls based on the mapping. The edge node for the service provider network receives an access request from the IoT device, applies a network-layer access control for the IoT device based on the instructions, receive IoT data from the IoT device when the edge node permits access by the IoT device, and forwards the IoT data to the virtual endpoint.

According to another implementation, the edge node receives a group instruction for the IoT device and multiple other IoT devices. Each of the multiple other IoT devices has a different corresponding virtual endpoint with a different network address. The edge node delivers, via multicast, the group instruction to each of the IoT device and multiple other IoT devices.

According to another implementation, the edge node logs a connection checkpoint corresponding to a disconnection time of a VLAN connection between the IoT device and the virtual endpoint; stores a continuous historic event stream of communications to and from the IoT device; identifies, another VLAN connection between the IoT device and the virtual endpoint; and forwards the continuous historic event stream from the checkpoint onward.

FIG. 1 is a diagram illustrating an exemplary network environment 100 in which systems and/or methods described herein may be implemented. As illustrated, network environment 100 may include IoT devices 110-1 through 110-N (collectively "IoT devices 110" and singularly "IoT device 110"), user devices 120-1 through 120-M (collectively "user devices 120" and singularly "user device 120"), an access network 130, a core network 140 that includes network devices 145, a packet data network (PDN) 150, and multiple IoT cloud platforms 160.

As further illustrated, network environment 100 includes communicative links 170 between the network elements and networks (although only two are referenced in FIG. 1 as links 170-1 and 170-2). A network element may transmit and receive data via link 170. Environment 100 may be implemented to include wireless and/or wired (e.g., electrical, optical, etc.) links 170. A communication connection between network elements may be direct or indirect. For example, an indirect communication connection may involve an intermediary device or network element, and/or an intermediary network not illustrated in FIG. 1. Additionally, the number, the type (e.g., wired, wireless, etc.), and the arrangement of links 170 illustrated in environment 100 are exemplary.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

IoT device 110 may include a variety of devices that can communicate with other devices in network environment 100. Examples of IoT device 110 include a location tag, an activity monitor, a connected thermostat, a monitoring camera, a sensor device, a metering device, or anything that has an Internet connection. In one implementation, IoT device 110 may connect to the Internet to report data or request information from IoT cloud platform 160. IoT device 110 may also listen to and/or be paged from devices via access network 130. IoT device 110 typically has one or more specific functions to perform, such as measuring, monitoring, and/or reporting data. IoT device 110 may connect to access network 130 in different ways, such as via a fixed Wi-Fi connection, a Bluetooth connection, a direct wireless network connection (e.g., a cellular connection using 3G, 4G or 5G standards), or a proprietary connection to a wireless network. While a few IoT devices 110 are shown in FIG. 1, in practice there may be hundreds of thousands or millions of IoT devices 110. IoT devices may also be referred to as machine-type communication (MTC) devices.

User device 120 may include a computational or communication device. User device 120 may enable a user to control or otherwise communicate with IoT devices 110. For example, user device 120 may include a personal computer (e.g., a laptop or desktop PC), a tablet computer, a smart phone, an Internet-enable television (e.g., a smart TV), a set-top box (STB), a gaming system, or another type of computational or communication device that can communicate with devices in network environment 100. In one implementation, user device 120 may include one or more applications to access data from and manage IoT devices 110 via service provider network 130 and/or IoT cloud platforms 160.

Service provider network 130 may generally include one or more wired, wireless and/or optical networks that are capable of receiving and transmitting data, voice and/or video signals, including multi-media signals that may include voice, data and video information. For example, service provider network 130 may include one or more access networks, IP multimedia subsystem (IMS) networks, evolved packet core (EPC) networks, or other networks. The access network may include one or more wireless networks and may include a number of transmission towers for receiving wireless signals and forwarding the wireless signals toward the intended destinations. The access network may include a wireless communications network that connects subscribers (e.g., user device 180) to other portions of Service provider network 130 (e.g., the EPC network). In one example, the access network may include a long-term evolution (LTE) network. In other implementations, the access network may employ other cellular broadband network standards such as 3rd Generation Partnership Project (3GPP) 5G and future standards. Service provider network 130 may further include one or more satellite networks, one or more packet switched networks, such as an IP-based network, a local area network (LAN), a wide area network (WAN), a personal area network (PAN) (e.g., a wireless PAN), a wireless local area network (WLAN), an intranet, the Internet, or another type of network that is capable of transmitting data.

In an exemplary implementation, service provider network 130 may represent a network associated with a service provider that provides various services, such as Internet-protocol (IP) related services, value added services, etc. Service provider network 140 may include an IP network or a multiprotocol label switching (MPLS) network implementing an Interior Gateway Protocol (IGP) or another protocol that implements a minimum cost end-to-end path for routing between nodes. According to implementations described herein, service provider network 140 may employ Software Defined Networking (SDN) tools and conventions, including a separate service orchestration layer, control layer, and resources (or forwarding) layer. As described further herein, service provider network 130 may include regional clusters of network devices 140 and/or virtual nodes to enable use of virtual network endpoints for IoT devices.

Network device 140 may include a device configured to perform network functions in service provider network 130. For example, network device 140 may include a switch, a router, a firewall, a gateway, a NAT device, a Reconfigurable Optical Add-Drop Multiplexer (ROADM), and/or another type of network device. Some or all of the functionality of network device 140 may be virtualized as a virtual network function (VNF) in service provider network 130. Depending on the implementation of network 130, network 130 may include various types of network devices 120, such as, for example, a wireless station (e.g., a base station, an evolved NodeB, a next-generation NodeB, etc.), a gateway device (e.g., a serving gateway (SGW) or a PDN gateway (PGW)), a support node, a serving node, a mobility management entity (MME), a core access and mobility management function (AMF), a session management function (SMF), a policy control function (PCF), a policy charging rules function (PCRF), as well other network devices that provide various network-related functions and/or services, such as charging and billing, security, authentication and authorization, network policy enforcement, management of subscriber profiles, and/or other functions and/or services that facilitate the operation of a core network. Network devices 140 may receive, store, and enforce policies for end devices (e.g., IoT devices 110 and user devices 120) and virtual network endpoints in IoT cloud platforms 160.

PDN 150 may include one or more networks, such as the Internet, a local area network (LAN), etc., capable of communicating with IoT devices 110. In one implementation, PDN 150 includes a network that provides data services (e.g., via packets or any other Internet protocol (IP) datagrams).

Cloud platform 160 may include network devices, computing devices, and other equipment to provide services, including services for customers with IoT devices 110. In one implementation, cloud platform 150 may include components for authentication and provisioning, device profiles, a rules engine, and virtual network endpoints. The authentication and provisioning component may perform a provisioning process for an IoT device 110 including authentication, registration, and activation in service provider network 130. The device profiles component may store device profiles and related information for each IoT device 110 or groups of IoT devices 110. The rules engine component may allow users (e.g., of user devices 120) to define the rules for each IoT device 110 or a group of IoT devices 110. These rules can be used for backend services or for IoT device 110 configurations. For the latter, rules can be pushed to the corresponding IoT device 110 for configuration. According to an implementation, cloud platforms 160 may use vendor-specific protocols to support IoT management. Examples of hosting platforms that may use different protocols and commands include Amazon® Web Services (AWS), Microsoft Azure®, IBM IOT Bluemix®, etc. According to implementations described herein, IoT devices are represented as virtual network points accessible in a local private network (e.g., within one of cloud platforms 160), allowing a customer (e.g., using user device 120) to interact with IoT device 110 as a virtual network endpoint, regardless of whether or not the physical IoT device 110 is currently connected to service provider network 130.

In FIG. 1, the particular arrangement and number of components of network environment 100 are illustrated for simplicity. In practice, there may be more IoT devices 110, user devices 120, service provider networks 130, network devices 140, PDNs 150, and cloud platforms 160. For example, there may be hundreds of thousands or millions of IoT devices 110.

Figure 2:
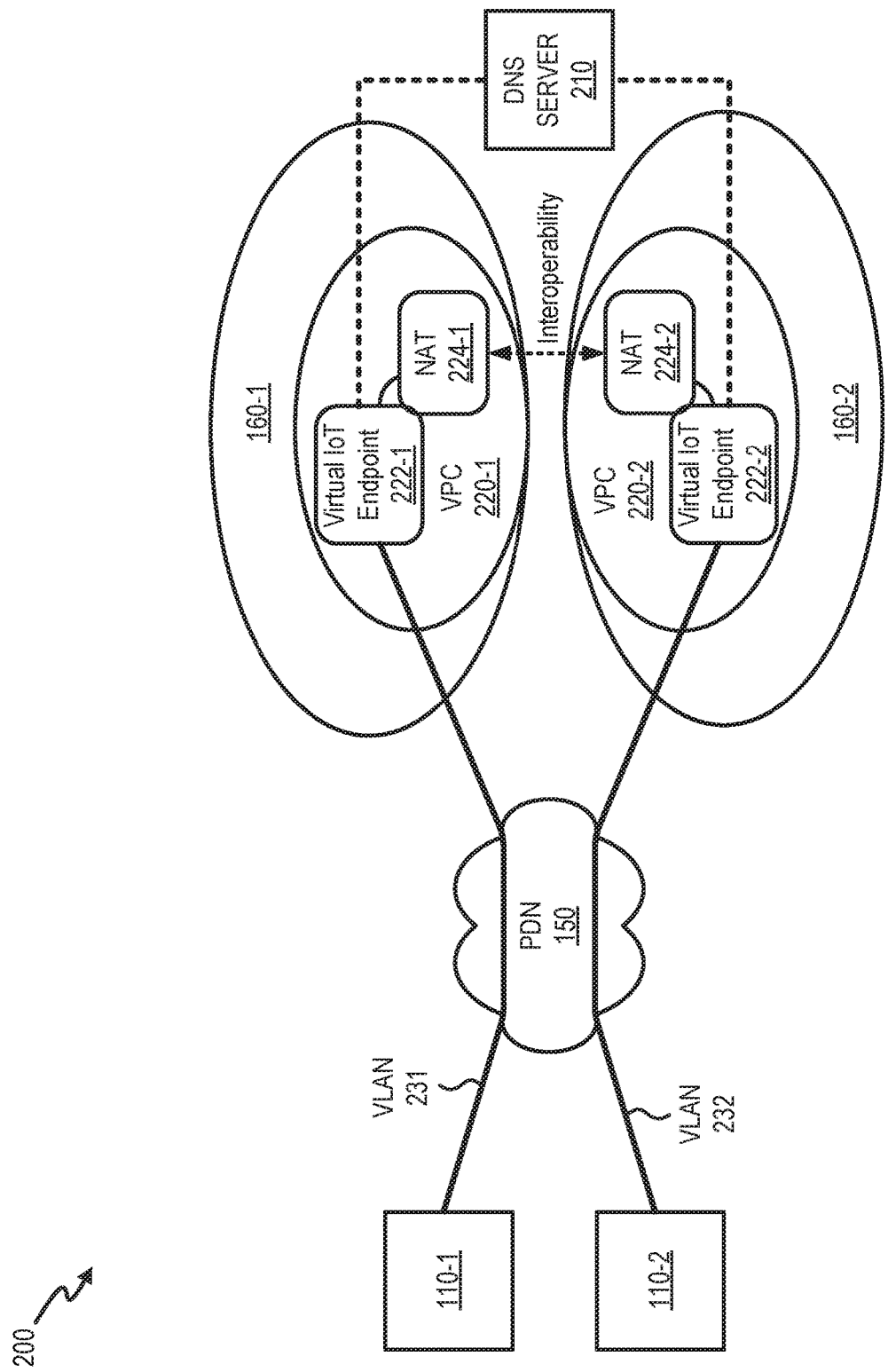
FIG. 2 is a diagram showing IoT devices represented as virtual network endpoints in a portion of the network environment of FIG. 1, according to an implementation described herein.

FIG. 2 is a diagram showing IoT devices represented as virtual network endpoints, according to an implementation. As shown in FIG. 2, a portion 200 of network environment 100 may include IoT devices 110-1 and 110-2, PDN 150, cloud platforms 160-1 and 160-2, and a domain name system (DNS) server 210. IoT devices 110, PDN 150, and cloud platforms 160 may include functionality described above in connection with, for example, FIG. 1.

DNS server 210 includes one or more network devices that receive domain names in DNS queries, and resolves (i.e., translates) those domain names into corresponding IP addresses. DNS server 210 may return the resolved IP address to the network device that originated the DNS query. According to implementations described herein, customers with IoT devices 110 may voluntarily register virtual IoT endpoints 222 with DNS server 210.

As further shown in FIG. 2, each of cloud platforms 160-1 and 160-2 may include a virtual private cloud (VPC) 220 with a virtual IoT endpoint 222 and a network address translator (NAT) 224. Each of cloud platforms 160-1 and 160-2 may be operated, for example, by different vendors. Each of VPC 220-1 and VPC 220-2 may include a logically isolated section within respective cloud platforms 160-1 and 160-2, such that IoT devices may establish virtual LAN (VLAN) connections with Virtual IoT endpoints 222.

FIG. 2 demonstrates a common IoT use case, where IoT devices 110-1 and 110-2 need to operate together, but are hosted in different clouds (e.g., cloud platform 160-1 and cloud platform 160-2). For example, assume in FIG. 2 that IoT device 110-1 is a home thermostat hosted by a one vendor in cloud platform 160-1, while IoT device 110-2 is a smart energy meter hosted by a different vendor in cloud platform 160-2. To save energy while preserving comfort in the home, IoT device 110-1 needs to communicate with IoT device 110-2. However, there are no universally accepted standards or protocols among IoT cloud providers to connect IoT devices 110-1 and 110-2.

In conventional device shadow arrangements, IoT interoperability can be only implemented on a case-by-case basis, through separate negotiation and integration at the application level. Often this application level implementation is proprietary and is hard to reuse. In contrast, according to implementations described herein, the interoperability of IoT devices 110-1 and 110-2 can be achieved at the network layer, where universal protocols and tools are established to connect devices in different network segments, without peer to peer negotiation and integration.

As shown in FIG. 2, IoT devices 110-1 and 110-2 are represented as two different endpoints, virtual IoT endpoints 222-1 and 222-2, respectively, in VPCs 220-1 and 220-2. IoT device 110-1 may connect to virtual IoT endpoint 222-1 through a VLAN connection 231. IoT device 110-2 may connect to virtual IoT endpoint 222-2 through a VLAN connection 232. The state of the physical devices (e.g., IoT devices 110-1 and 110-2) and virtual endpoints (e.g., virtual IoT endpoints 222-1 and 222-2) can be synchronized as long as the respective VLAN connectivity remains. Interoperability of IoT devices 110-1 and 110-2 is achieved through (1) voluntarily registering each of virtual IoT endpoints 222-1 and 222-2 to a public domain service device (e.g., DNS server 210) and (2) discovering the IoT virtualization service via a DNS lookup (e.g., using a Network Address Translation (NAT) service 224).

Figure 3:
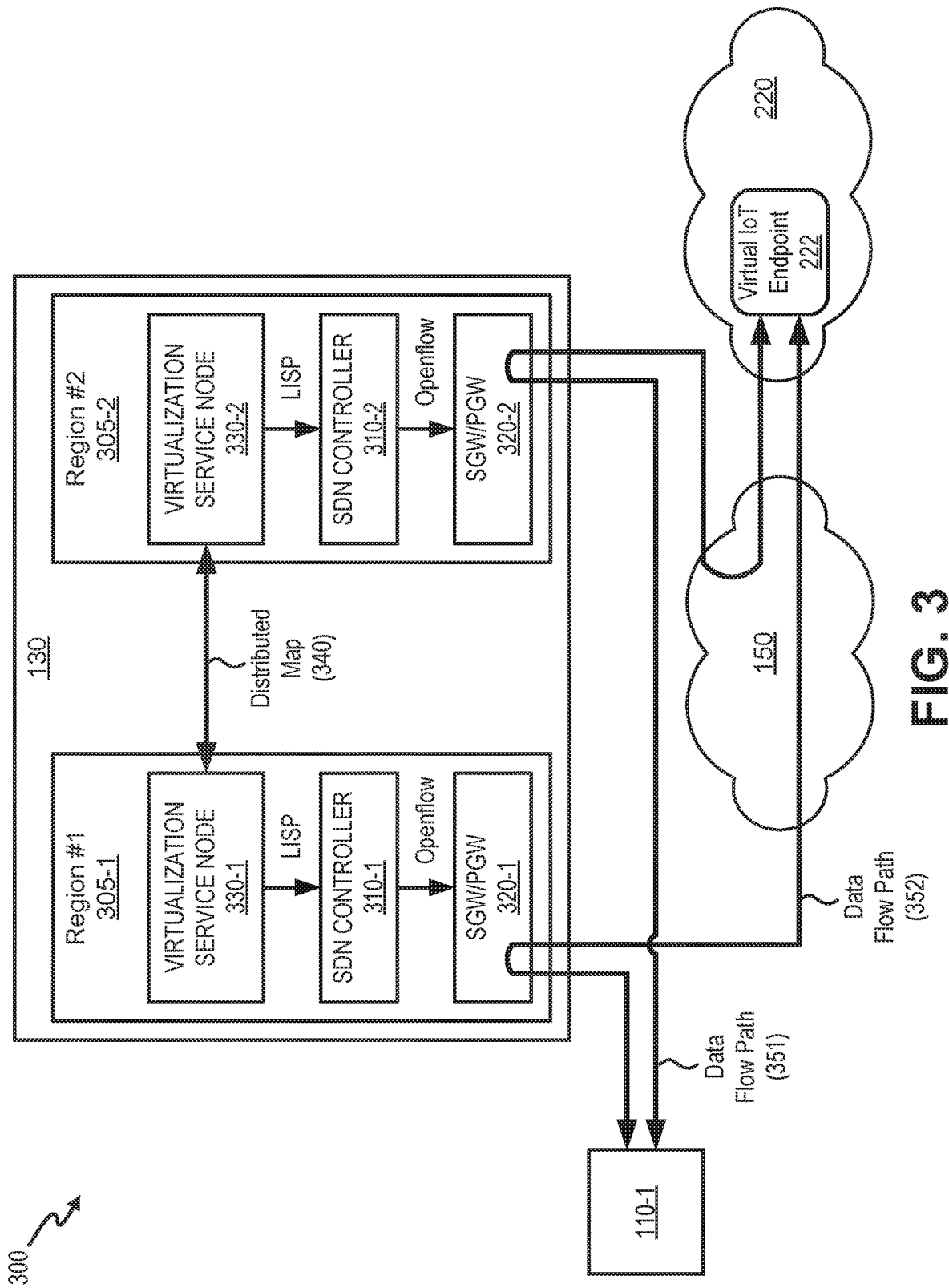
FIG. 3 is a diagram showing components in the service provider network of FIG. 1 supporting virtual network endpoints, according to an implementation described herein.

FIG. 3 is a diagram showing components in service provider network 130 supporting virtual network endpoints, according to an implementation. FIG. 3 illustrates a reference architecture to implement IoT virtual network mapping using software-defined networking (SDN) with OpenFlow communication protocols. In other embodiments, similar concepts can be implemented in a non-SDN network. As shown in FIG. 3, a portion 300 of network environment 100 may include IoT device 110, service provider network 130, PDN 150, and VPC 220 with virtual IoT endpoint 222. IoT device 110, PDN 150, VPC 220, and virtual IoT endpoint 222 may include functionality described above in connection with, for example, FIGS. 1 and 2.

According to an implementation, service provider network 130 may be divided into multiple regional clusters, including a first regional cluster 305-1 and a second regional cluster 305-2. Each regional cluster 305 may include an SDN controller 310, a serving gateway (SGW), and PDN gateway (PGW) 320. According to implementations described herein, regional clusters 305 of service provider network 130 also include a virtualization service node 330 located at the edge of service provider network 130, running on top of SDN controller 310.

SDN controller 310 may include computing devices or network devices that provide control plane functionality to direct data flows between IoT device 110 and virtual IoT endpoint 222. Each SDN controller 310 may be included within a control layer of service provider network 130. SDN controller 310 may include an application that manages flow control to enable intelligent networking. In one implementation, controller 120 may translate commands from an orchestration layer (e.g., orchestration system 125) into a format that can be used with forwarding boxes 110. For example, SDN controller 310 may communicate with SGW/PGW 320 and other elements of service provider network 130 to manage data flows from one endpoint to another. In one implementation, SDN controller 310 may use existing protocols, such as OpenFlow.

SGW/PGW 320 may include network devices (e.g., network devices 140) to forward data to/from IoT device 110. The SGW may provide an access point to and from IoT device 110, may handle forwarding of data packets for IoT device 110, and may act as a local anchor point during handover procedures between wireless stations (such as an eNodeB or a next generation NodeB). The PGW may function as a gateway to PDN 150. In one exemplary implementation, the PGW may be a traffic exit/entry point for a core network. The PGW may perform policy enforcement, packet filtering for each user, charging support, lawful intercept, and packet screening. The PGW may also act as an anchor for mobility between 3GPP and non-3GPP technologies.

Virtualization service node 330 is responsible for managing the interaction between IoT device 110 and its corresponding virtual IoT endpoint 222. Virtualization service node 330 may be implemented, for example, as a virtual node (e.g., a VNF) or a physical device. Virtualization service node 330 may control the data flow of all IoT device 110 located in a respective regional cluster 305. According to one implementation, a region service by a regional cluster may be an area serviced by a SGW or another edge node. Virtualization service node 330 may perform functions to maintain status synchronization between IoT device 110 and virtual IoT endpoint 222, as well as routing to the correct regional cluster 305. According to one implementation, virtualization service node 330 may communicate with SDN controller 310 using Locator/ID Separation Protocol (LISP).

Still referring to FIG. 3, IoT network traffic patterns are asymmetric in many cases, and therefore asymmetric routing is sometimes used in conventional implementations. In asymmetric routing, a data packet traverses from a source to a destination via one path (region) and takes a different path (region) when it returns to the source. In contrast with asymmetric routing, implementations described herein may use a cluster approach to better support security and management, inherent in the distributed nature of a networking service proxy. Distributed nodes (e.g., SDN controller 310, SGW/PGW-U 320, and virtualization service node 330) in different regions 305 participate in a cluster to exchange information regarding a network status of IoT device 110. Network status may include, for example, joining and leaving a region. The regional clusters 305 provide a consistent framework to route traffic, manage address mapping (e.g., IoT device ID-to-virtual address mapping) and manage security.

With IoT devices' computation/network constraint, it is a challenge to keep consistent status synchronization between IoT devices 110 and their corresponding virtual IoT endpoints 222. Many IoT devices 110 are not capable of supporting a full status poll (e.g., storing a full history and status log). Also, due to limited device battery life and potentially inconsistent network connectivity, IoT devices 110 may only be synchronized when IoT device 110 wakes up (e.g., when using features such as Power Saving Mode (PSM) and extended Discontinuous Reception (eDRX)) and has a network connection at that time. According to embodiments described herein, virtualization service node 330 may include a playback mechanism with checkpoints to synchronize IoT device 110 status with its corresponding virtual IoT endpoints 222. With the continuous historic event stream, virtualization service nodes 330 can construct the current IoT device status and assign its value to virtual IoT endpoint 222 by playing back the event streams received from IoT device 110. When network connectivity is re-established and proxy status confirmed with device, virtualization service node 330 records the checkpoint. Every stream playback can occur starting from the latest checkpoint and onwards.

Figure 4:
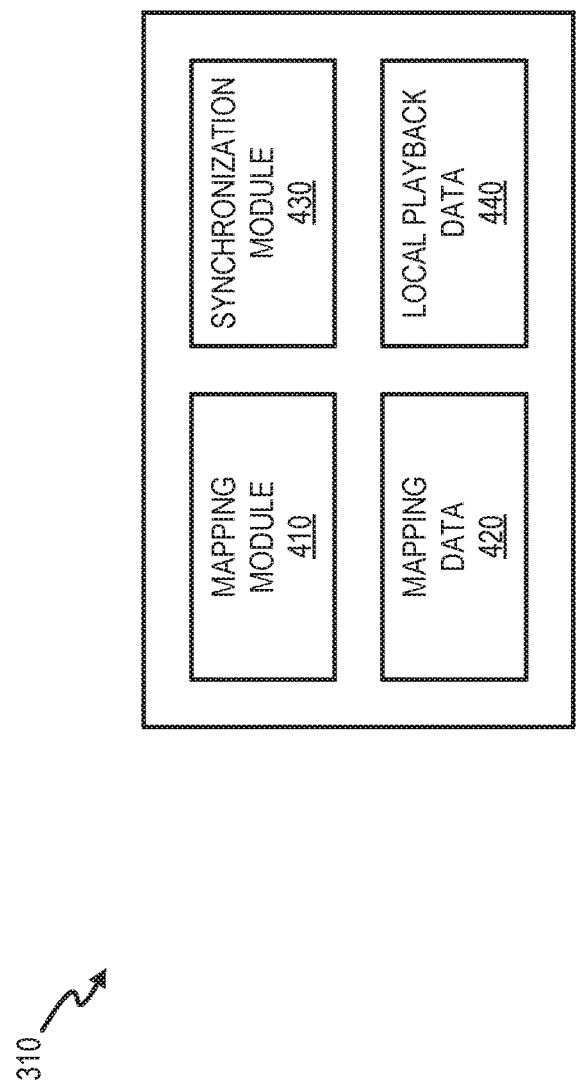
FIG. 4 is a block diagram of exemplary logical components of a virtualization service node of FIG. 3 according to an implementation described herein.

FIG. 4 is a block diagram of exemplary logical components of virtualization service node 330, according to an implementation. As shown in FIG. 4, virtualization service node 330 may include a mapping module 410, mapping data 420, a synchronization module 430, and local playback data 440.

Mapping module 410 may be used to implement a distributed mapping of IoT devices 110 and corresponding virtual IoT endpoints 222. For example, a customer (e.g., an enterprise customer with numerous IoT devices 110) may register for an IoT virtualization service offered through service provider network 130. Virtual endpoints 222 for each IoT device 110 may be registered with a DNS (e.g., DNS server 210) to permit discovery. After registering with the DNS, the customer may provide a listing of IoT devices 110 matched to IPv6 addresses for their corresponding virtual IoT endpoints 222. Mapping module 410 may generate an access control list (ACL) or firewall settings based on the customer IoT device ID/network address associations. In one implementation, after an initial connection by an IoT device 110, mapping module 410 may associate the IoT device with a particular region (e.g., SGW/PGW 320).

Mapping data 420 may include a database, a flat file, or another data structure to associate an IoT device identifier (ID) with a network address (e.g., an IPv6 address for virtual IoT endpoint 222). Mapping data 420 may additionally include regions (e.g., identifiers for a regional cluster 305 and/or SGW) associated with IoT devices 110. Mapping module 410 may replicate all or part of mapping data 420 with mapping modules in other regions 305 in service provider network 130.

Synchronization module 430 may monitor state information for IoT devices 110. Because some IoT devices 110 typically disconnect from a network to conserve battery power and network resources, synchronization module 430 assist to enable interaction with IoT devices 110 without continuous device connectivity. According to one implementation, synchronization module 430 may implement checkpoints with stored event playback data to provide for synchronization between virtual IoT endpoint 222 and IoT device 110. For example, synchronization module 430 may log a connection checkpoint corresponding to a disconnection time of a VLAN connection between IoT device 110 and virtual endpoint 222. Synchronization module 430 may store (or cause another network device, such as edge node 320 to store) a continuous historic event stream of communications to and/or from IoT device 110. Synchronization module 430 may identify when IoT device 110 establishes another VLAN connection with virtual endpoint 222 and forward (or cause another network device, such as edge node 320 to forward) the continuous historic event stream from the checkpoint onward to synchronize states for virtual IoT endpoint 222 and IoT device 110.

Local playback data 440 may include a database or another type of data structure to locally store historic event streams for IoT devices 110 associated with a particular region. Synchronization module 430 may retrieve local playback data 440 when needed for synchronization of an IoT device 110 with its virtual IoT endpoint 222. Thus, according to implementations described herein, historic IoT data (e.g., to be used for synchronization) may be maintained geographically near the relevant IoT devices 110 and provide more efficient use of network resources (as compared to being passed through the entire network to be stored in and retrieved from a host's IoT cloud platform).

Although FIG. 4 shows exemplary logical components of virtualization service node 330, in other implementations, virtualization service node 330 may include fewer logical components, different logical components, or additional logical components than depicted in FIG. 4. Additionally or alternatively, functions of one or more logical components of virtualization service node 330 may be performed by one or more devices in regional cluster 305. For example, SDN controller 310 or SGW/PGW-U 320 may perform some or all of one of the logical functions described in connection with FIG. 4.

Figure 5:
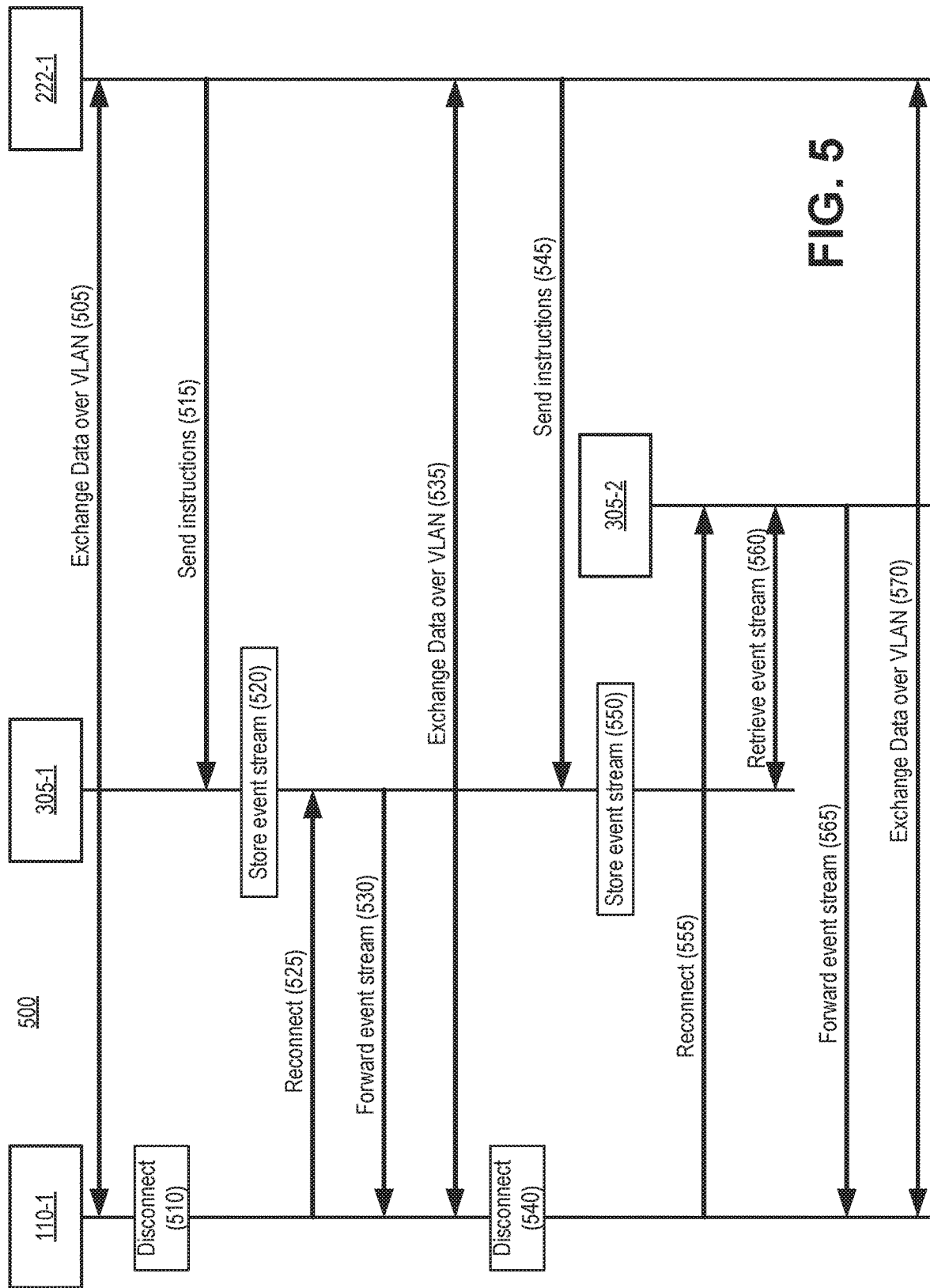
FIG. 5 is a diagram illustrating exemplary communications for using a virtual network endpoint in a portion of the network environment of FIG. 1.

FIG. 5 is a diagram illustrating exemplary communications for using a virtual network endpoint in a portion 500 of network environment 100. As shown in FIG. 5, network portion 500 may include IoT device 110-1, virtual IoT endpoint 222-1, regional cluster 305-1 and regional cluster 305-2. IoT device 110-1, virtual IoT endpoint 222-1, and regional clusters 305 may include features described above in connection with FIGS. 1-4.

Referring to FIG. 5, IoT device 110-1 may exchange data with virtual IoT endpoint 222-1 over an established VLAN connection serviced by regional cluster 305-1, as shown at reference 505. IoT device 110-1 may then disconnect 510 from the network (e.g., due to a power saving features). While IoT device 110-1 is disconnected, virtual IoT endpoint 222-1 may receive and forward instructions 515 or other data toward IoT device 110-1. While IoT device 110-1 is disconnected, devices in regional cluster 305-1 may locally store an event stream 520 (e.g., in local playback data 440), which may include instructions 515 and any other communications to/from IoT device 110-1 before a VLAN connection is resumed.

Still referring to FIG. 5, IoT device 110-1 may eventually wake-up and attempt to reconnect 525 to virtual IoT endpoint 222-1. Assuming IoT device 110-1 is accepted through network access controls (e.g., enforced at the SGW), devices in regional cluster 305-1 may forward the historic event stream 530 to IoT device 110-1. IoT device 110-1 may receive event stream 530 to synchronize state with virtual IoT endpoint 222-1 and may then exchange data with virtual IoT endpoint 222-1 over the established VLAN connection serviced by regional cluster 305-1, as shown at reference 535.

IoT device 110-1 may eventually again disconnect 540 from the network. While IoT device 110-1 is disconnected, virtual IoT endpoint 222-1 may receive and forward additional instructions 545 or other data toward IoT device 110-1. While IoT device 110-1 is disconnected, devices in regional cluster 305-1 may locally store an event stream 550, which may include instructions 545 and any other communications to/from IoT device 110-1 before a VLAN connection is resumed.

IoT device 110-1 eventually may attempt to reconnect 555 to virtual IoT endpoint 222-1 from a different location that is associated with regional cluster 305-2. Assuming IoT device 110-1 is accepted through network access controls (e.g., enforced at the SGW), devices in regional cluster 305-2 (e.g., using mapping data 420) may retrieve 560 the historic event stream 550. Devices in regional cluster 305-2 may then forward the historic event stream 565 to IoT device 110-1. IoT device 110-1 may receive event stream 565 to again synchronize state with virtual IoT endpoint 222-1 and may then exchange data with virtual IoT endpoint 222-1 over the established VLAN connection serviced by regional cluster 305-2, as shown at reference 570.

Although FIG. 5 shows exemplary communications for implementing using a virtual network endpoint, in other implementations more, fewer or different communications may be used.

Figure 6:
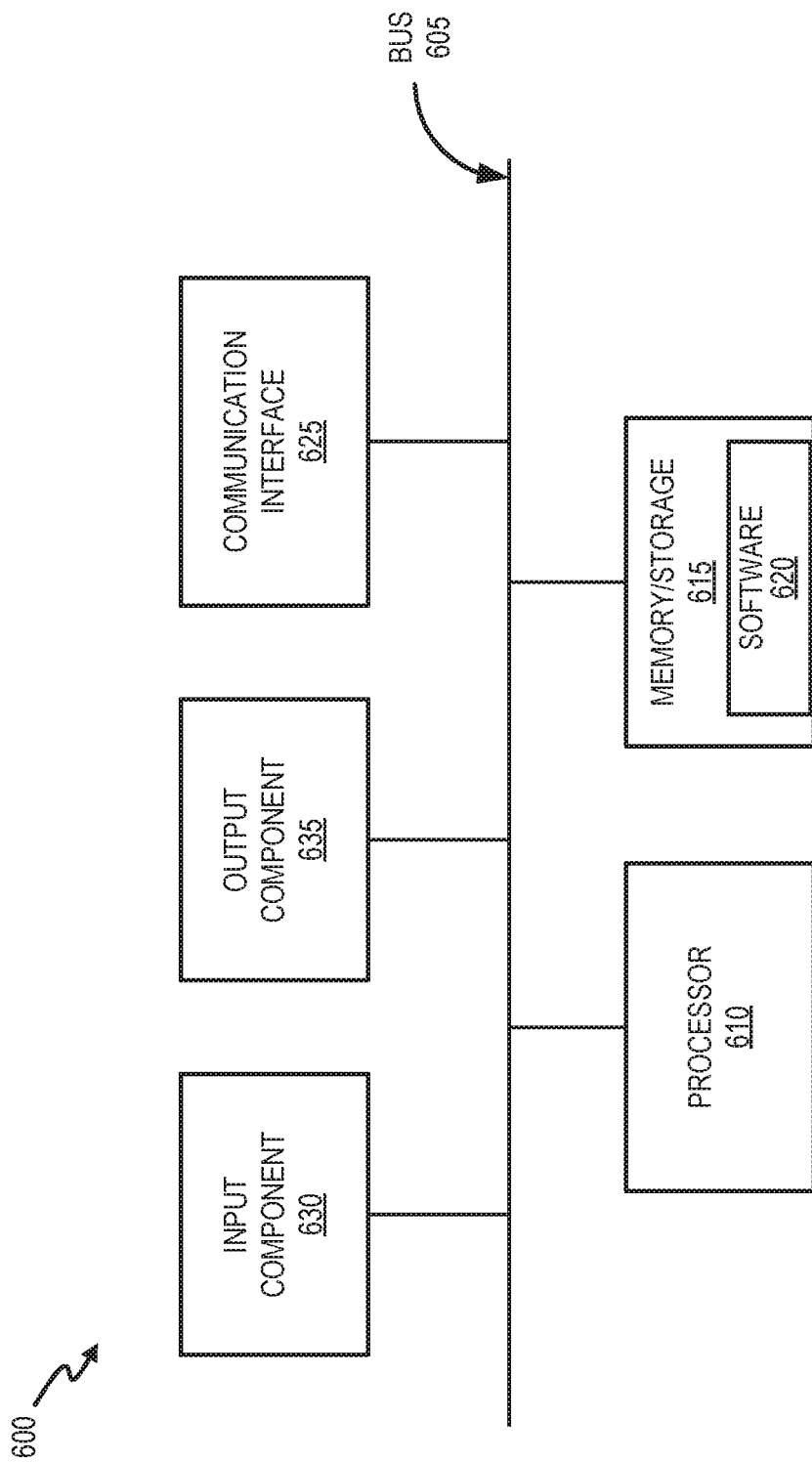
FIG. 6 is a block diagram illustrating exemplary components of a device that may correspond to one or more of the devices of FIG. 1.

FIG. 6 is a diagram illustrating exemplary components of a device 600 that may correspond to one or more of the devices described herein. For example, device 600 may correspond to components included in IoT device 110, user device 120, virtual endpoint 222, NAT 224, SDN controller 310, SGW/PGW-U 320, and virtualization service node 330.

As illustrated in FIG. 6, according to an exemplary embodiment, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, and/or clocks.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc. Processor 610 may be a dedicated component or a non-dedicated component (e.g., a shared resource).

Processor 610 may control the overall operation, or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation, and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium.

Memory/storage 615 may include a drive for reading from and writing to the storage medium.

Memory/storage 615 may be external to and/or removable from device 600, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. Software 620 may include an operating system. Software 620 is also intended to include firmware, middleware, microcode, hardware description language (HDL), and/or other forms of instruction. Additionally, for example, end device 110 may include logic to perform tasks, as described herein, based on software 620.

Communication interface 625 permits device 600 to communicate with other devices, networks, systems, devices, and/or the like. Communication interface 625 includes one or multiple wireless interfaces and/or wired interfaces. For example, communication interface 625 may include one or multiple transmitters and receivers, or transceivers. Communication interface 625 may include one or more antennas. For example, communication interface 625 may include an array of antennas. Communication interface 625 may operate according to a protocol stack and a communication standard. Communication interface 625 may include various processing logic or circuitry (e.g., multiplexing/de-multiplexing, filtering, amplifying, converting, error correction, etc.).

Input 630 permits an input into device 600. For example, input 630 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 635 permits an output from device 600. For example, output 635 may include a speaker, a display, a light, an output port, and/or some other type of visual, auditory, tactile, etc., output component. According to some embodiments, input 630 and/or output 635 may be a device that is attachable to and removable from device 600.

Device 600 may perform a process and/or a function, as described herein, in response to processor 610 executing instructions contained in a computer-readable medium, such as software 620 stored by memory/storage 615. A computer-readable medium may be defined as a non-transitory memory device. A memory device may include space within a single physical memory device or spread across multiple physical memory devices. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7:
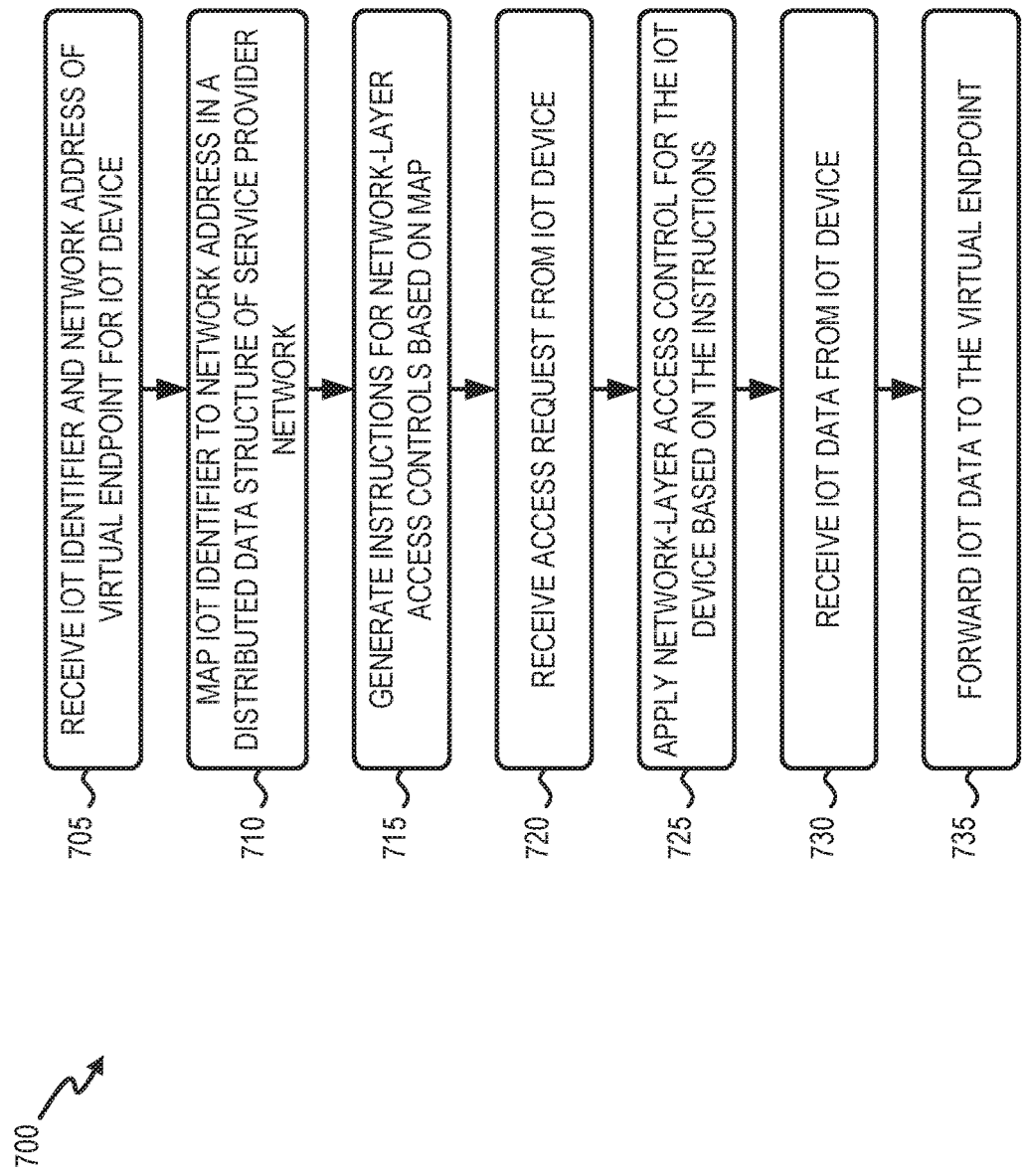
FIG. 7 is a flow diagram of an exemplary process for providing network access controls using a virtual network endpoint in an IoT environment, according to an implementation described herein.

FIG. 7 provides a flow diagram of an exemplary process 700 for providing network access controls using a virtual network endpoint in an IoT environment. In one implementation, process 700 may be performed by a regional cluster 305. In another implementation, some or all of process 700 may be performed by another device or group of devices, including or excluding devices regional cluster 305.

As shown in FIG. 7, process 700 may include receiving an IoT identifier and a network address of virtual endpoint for an IoT device (block 705) and mapping the IoT identifier to the network address in a distributed data structure of a service provider network (block 710). For example, virtual endpoints 222 corresponding to each IoT device 110 may be registered with a DNS (e.g., DNS server 210) to permit discovery. After registering with DNS, the customer may provide a listing of IoT devices 110 matched to network addresses for their corresponding virtual IoT endpoints 222. In one implementation, after an initial connection by an IoT device 110, mapping module 410 may associate the IoT device within a particular region (e.g., SGW/PGW 320).

Process 700 may also include generating instructions for network-layer access controls based on the mapping (block 715). For example, virtualization service node 330 (e.g., mapping module 410) may generate an ACL or firewall settings based on the customer IoT device ID/network address associations.

Process 700 may further include receiving a network access request from the IoT device (block 720), and applying network-layer access controls for the IoT device based on the instructions (block 725). For example, IoT device 110 may request network access to virtual IoT endpoints 222 (e.g., upon waking up from an extended sleep mode, etc.). Regional cluster 305 (e.g., PGW of SGW/PGW 320) may apply the ACL or firewall settings to restrict network access to authorized devices.

Process 700 may additionally include receiving IoT data from the IoT device (block 730) and forwarding IoT data to the virtual endpoint (block 735). For example, assuming IoT device 110 is given network access, IoT device 110 and virtual IoT endpoint 222 may establish a VLAN connection with flow governed by regional cluster 305. IoT device 110 may send data (e.g., sensor data, etc.) toward virtual IoT endpoint 222 and receive data/instructions from virtual IoT endpoint 222.

Figure 8:
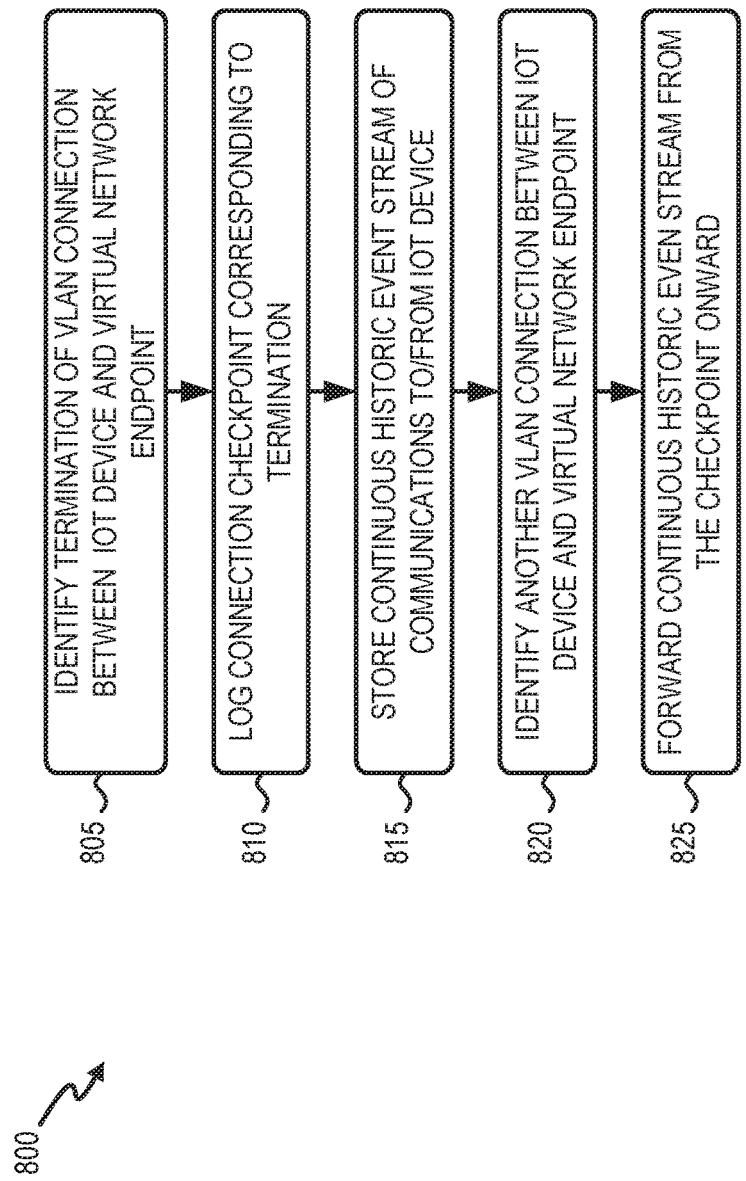
FIG. 8 is a flow diagram of an exemplary process for synchronizing an IoT device and a virtual network endpoint, according to an implementation described herein.

FIG. 8 provides a flow diagram of an exemplary process 800 for synchronizing an IoT device and a virtual network endpoint, according to an implementation described herein. In one implementation, process 800 may be performed by a regional cluster 305. In another implementation, some or all of process 800 may be performed by another device or group of devices, including or excluding devices regional cluster 305.

As shown in FIG. 8, process 800 may include identifying termination of a VLAN connection between an IoT device and a virtual network endpoint (block 805), and logging a connection checkpoint corresponding to the termination (block 810). For example, regional cluster 305 may detect termination of a VLAN connection between IoT device 110 and virtual IoT endpoint 222. Regional cluster 305 (e.g., synchronization module 430) may log a connection checkpoint corresponding to a disconnection time of the VLAN connection.

Process 800 may also include storing a continuous historic event stream of communications to and/or from the IoT device (block 815), identifying another VLAN connection between the IoT device and the virtual network endpoint (block 820), and forwarding the continuous historic event stream from the time of the checkpoint onward (block 825). For example, Regional cluster 305 (e.g., synchronization module 430) may store a continuous historic event stream of communications to and/or from IoT device 110. Regional cluster 305 may identify when IoT device 110 establishes another VLAN connection with virtual endpoint 222 and forward the continuous historic event stream from the checkpoint onward to synchronize states for virtual IoT endpoint 222 and IoT device 110.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 7 and 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method performed by one or more nodes in a service provider network, the method comprising:
   receiving Internet-of-Things (IoT) identifiers for IoT devices and network addresses for corresponding virtual endpoints for the IoT devices, wherein the virtual endpoints for the IoT devices are included in a host cloud platform;
   mapping the IoT identifiers to the network addresses for the service provider network;
   receiving control plane instructions for the IoT devices; and
   distributing the control plane instructions to the IoT devices via multicast.

2. The method of claim 1, further comprising:
   receiving an access request from one of the IoT devices; and
   applying a network-layer access control for the one of the IoT devices based on the mapping.

3. The method of claim 2, further comprising:
   receiving, from the one of the IoT devices, IoT data; and
   forwarding the IoT data to one of the corresponding virtual endpoints.

4. The method of claim 2, wherein the network-layer access control includes an access control list (ACL) or a firewall.

5. The method of claim 1, wherein a data structure stores the IoT identifiers mapped to the network addresses, and the data structure is shared between multiple nodes in the service provider network.

6. The method of claim 1, wherein the network addresses include Internet Protocol version 6 (IPv6) addresses.

7. The method of claim 1, further comprising:
   synchronizing a status of one of the IoT devices with one of the corresponding virtual endpoints.

8. The method of claim 7, wherein the synchronizing further comprises:
   logging a connection checkpoint corresponding to a disconnection of a virtual local area network (VLAN) connection between the one of the IoT devices and the one of the corresponding virtual endpoints;

storing, after the logging, a continuous historic event stream of communications to the one of the IoT devices;
identifying another VLAN connection between the one of the IoT devices and the one of the corresponding virtual endpoints; and
forwarding, after the identifying, the continuous historic event stream from the checkpoint.

9. The method of claim 1, wherein the one or more node are included within one of multiple regional clusters of the service provider network, each of the regional clusters comprising a serving gateway (SGW), a software-defined networking (SDN) controller, and a virtualization service function running on top of the SDN controller.

10. A system, comprising:
a virtualization service device, the virtualization service device comprising:
a first network interface to communicate with one or more remote systems,
one or more first memories to store instructions, and
one or more first processors configured to execute instructions in the one or more first memories to:
receive Internet-of-Things (IoT) identifiers for IoT devices and network addresses for corresponding virtual endpoints for the IoT devices, wherein the virtual endpoints for the IoT devices are included in a host cloud platform, and
map the IoT identifiers to the network addresses for a service provider network; and
a first edge node for the service provider network comprising:
a second network interface to communicate with the one or more remote systems,
one or more second memories to store instructions, and
one or more second processors configured to execute instructions in the one or more second memories to:
receive control plane instructions for the IoT devices; and
deliver, via multicast, the control plane instruction to each of the IoT devices.

11. The system of claim 10, wherein the one or more second processors are further configured to execute instructions in the one or more second memories to:
receive an access request from one of the IoT devices,
apply a network-layer access control for the one of the IoT devices based on the instructions,
receive from the one of the IoT devices, IoT data, and
forward the IoT data to one of the corresponding virtual endpoints.

12. The system of claim 11, further comprising:
a second edge node for the service provider network, the second edge node comprising:
a third network interface to communicate with the one or more remote systems,
one or more third memories to store instructions, and
one or more third processors configured to execute instructions in the one or more third memories to:
receive another access request from the one of the IoT devices;
apply the network-layer access control for the one of the IoT devices based on a data structure, wherein the data structure stores the IoT identifiers mapped to the network addresses;
receive, from the one of the IoT devices, IoT data, when the second edge node permits access to the one of the IoT devices; and
forward the IoT data to the one of the corresponding virtual endpoints.

13. The system of claim 12, wherein the data structure is shared between the first edge node and the second edge node in the service provider network.

14. The system of claim 10, wherein each of the IoT devices has a different corresponding virtual endpoint with a different network address.

15. The system of claim 10, wherein the network addresses include Internet Protocol version 6 (IPv6) addresses.

16. The system of claim 10, wherein the one or more second processors are further configured to execute instructions in the one or more second memories to:
log a connection checkpoint corresponding to a disconnection time of a virtual local area network (VLAN) connection between one of the IoT devices and one of the corresponding virtual endpoints;
store, after the logging, a continuous historic event stream of communications to and from the IoT device;
identify another VLAN connection between the one of the IoT devices and the one of the corresponding virtual endpoints; and
forward, after the identifying, the continuous historic event stream from the checkpoint onward.

17. A non-transitory computer-readable medium including instructions, executed by one or more processors, for causing the one or more processors to:
receive Internet-of-Things (IoT) identifiers for IoT devices and network addresses for corresponding virtual endpoints for the IoT devices, wherein the virtual endpoints for the IoT devices are included in a host cloud platform;
map the IoT identifiers to the network addresses for a service provider network;
receive control plane instructions for the IoT devices; and
multicast the control plane instructions to the IoT devices.

18. The non-transitory computer-readable medium of claim 17, further comprising instructions for causing the one or more processors to:
receive an access request from one of the IoT devices; and
apply a layer access control for the one of the IoT devices based on the mapping.

19. The non-transitory computer-readable medium of claim 17, further comprising instructions for causing the one or more processors to:
receive an access request from one of the IoT devices;
apply a network-layer access control for the one of the IoT devices based on a data structure, wherein the data structure stores the IoT identifiers mapped to the network addresses;
receive, from the one of the IoT devices, IoT data; and
forward the IoT data to one of the corresponding virtual endpoints.

20. The non-transitory computer-readable medium of claim 19, further comprising instructions for causing the one or more processors to:
log a connection checkpoint corresponding to a disconnection of a VLAN connection between the one of the IoT devices and the one of the corresponding virtual endpoints;
store, after the logging, a continuous historic event stream of communications to and from the IoT device;
identify another VLAN connection between the one of the IoT devices and the one of the corresponding virtual endpoints; and forward, after the identifying, the continuous historic event stream from the checkpoint.

\* \* \* \* \*